United States Patent [19]
Hess

[11] 3,819,926
[45] June 25, 1974

[54] WATERPROOF SIGNAL LIGHT FOR BOAT TRAILERS

[76] Inventor: Kenneth L. Hess, 6763 Ferrier Ct., Sacramento, Calif. 95822

[22] Filed: May 30, 1973

[21] Appl. No.: 365,140

[52] U.S. Cl. .............................. 240/7.1 R, 240/8.3
[51] Int. Cl. ......................... B60q 1/00, B60q 3/00
[58] Field of Search ........................ 240/7.1 R, 8.3

[56] References Cited
UNITED STATES PATENTS

| | | | |
|---|---|---|---|
| 2,786,935 | 3/1957 | Geary | 240/7.1 R X |
| 2,970,209 | 1/1961 | Glowzinski et al. | 240/7.1 R X |
| 2,985,750 | 5/1961 | Ritz-Woller et al. | 240/7.1 R |
| 3,581,081 | 5/1971 | Reith | 240/8.3 |
| 3,612,852 | 10/1971 | Bogossian | 240/8.3 |

Primary Examiner—Richard M. Sheer
Assistant Examiner—Richard A. Wintercorn
Attorney, Agent, or Firm—Blair & Brown

[57] ABSTRACT

A waterproof signal light for boat trailers including a metal housing having a transparent lense covering one side thereof. The housing has therein a transparent internal housing having an opening at the bottom thereof only. A bracket insertable through an opening in the bottom of the metal housing and the opening in the bottom of the transparent housing carries the signal bulb thereon. The bracket is secured to the metal housing so as to underlie the opening therein. When the boat trailer is backed into the water sufficiently to emerse the signal light in the water the air tight transparent inner housing will permit the water to raise until the pressure of air therein balances the pressure of the water at a point below the electric bulb and socket so that the electric bulb and socket does not become wetted when the signal light is emersed.

2 Claims, 5 Drawing Figures

PATENTED JUN 25 1974 3,819,926

WATERPROOF SIGNAL LIGHT FOR BOAT TRAILERS

BACKGROUND OF THE INVENTION

1. Field of the Invention

The present invention relates to waterproof signal lights for boat trailers.

2. Summary of the Invention

The signal light has a generally circular metal housing open on its rear circular wall and closed with a transparent colored lense. A generally rectangular opening at the bottom of the housing permits access to the housing. A transparent inner housing having an opening at the bottom thereof corresponding to the opening in the outer housing is positioned in the outer housing and a bracket containing the electric bulb and socket is inserted through the openings in the outer and inner housing and secured to the outer housing with a portion underlying the outer housing. Water rising in the inner housing due to the emersion of the signal light in the water is stopped from rising to the point reaching the bulb and socket by pressure of air trapped therein.

The primary object of the invention is to provide a waterproof boat trailer light which will remain functional after repeated emersions in water.

Other objects and advantages will become apparent in the following specification when considered in light of the attached drawings.

DESCRIPTION OF THE PREFERRED EMBODIMENT

Figure 1:
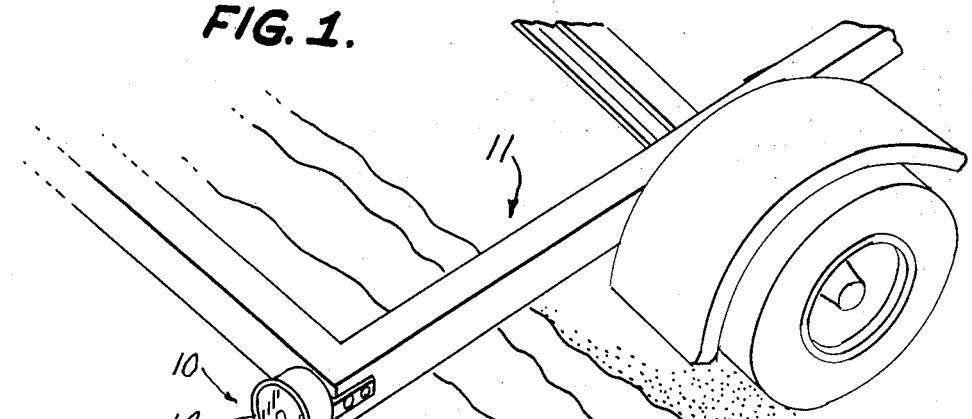
FIG. 1 is a perspective view of the invention shown attached to a boat trailer with parts broken away for convenience of illustration.
Figure 2:
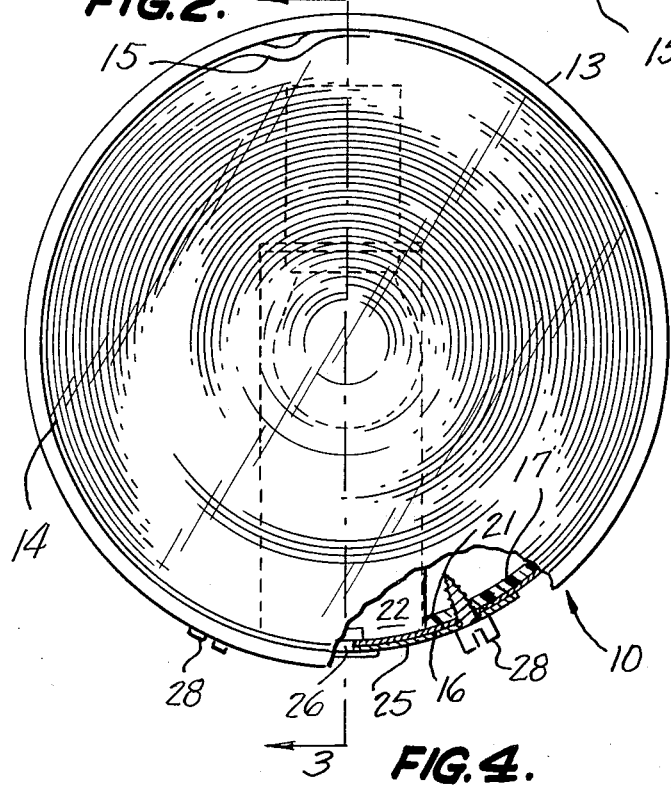
FIG. 2 is a rear elevation of the invention shown partially broken away and in section for convenience of illustration.
Figure 3:
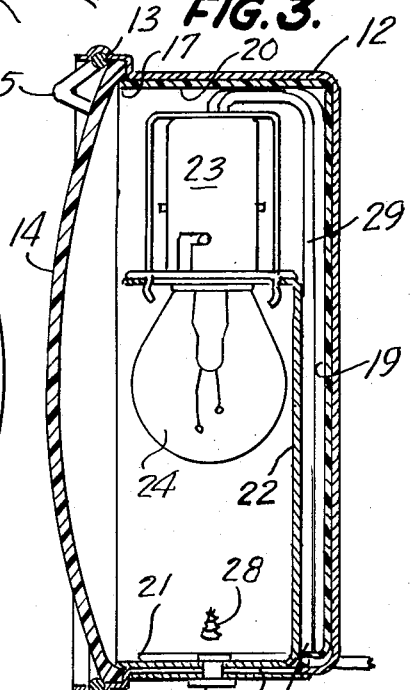
FIG. 3 is a vertical sectional view, taken along the line 3—3 of FIG. 2, looking in the direction of the arrows.

Referring now to the drawings in detail, wherein like reference characters indicate like parts throughout the several figures, the reference numeral 10 indicates generally a signal light for use with boat trailers of the type generally indicated at 11.

Figure 4:
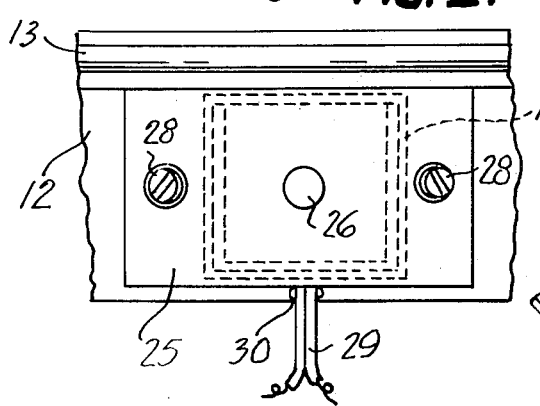
FIG. 4 is a fragmentary bottom plan view of the invention.
Figure 5:
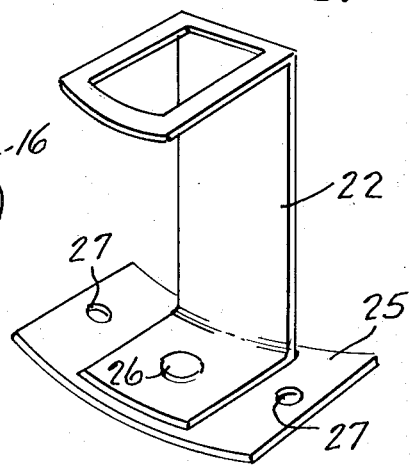
FIG. 5 is a perspective view of the light support bracket.

The signal light 10 includes a generally cylindrical metal housing 12 having a circular recessed rim 13 extending thereabout. A circular lense 14 is mounted in the rim 13 and secured therein by a spring ring 15. The housing 12 has a generally rectangular opening 16 formed in the bottom thereof as can be seen in dotted lines in FIG. 4.

A transparent inner housing 17 is positioned within the housing 12 and is cemented to the inner face of the lense 14 at 18. The housing 17 has a circular rear wall 19 and a generally cylindrical outer wall 20. The housing 17 has a generally rectangular opening 21 formed in the bottom thereof corresponding to the opening 16 in the housing 12. The inner housing 17 after cementing to the lense 14, has no other opening except the generally rectangular opening 21 and is otherwise air and water tight.

A generally U-shaped bracket 22 carries an electric socket 23 thereon supporting an electric bulb 24. The generally U-shaped bracket 22 is secured to a generally rectangular arcuate plate 25 by means of a rivet 26.

The plate 25 is provided with bores 27 throughwhich screws 28 extend to secure the plate 25 and thus the U-shaped bracket 22 to the housing 12.

The wires 29 from the socket 23 extend downwardly through the opening 21 in the inner housing 17 and out through an opening 30 in the housing 12.

In the use and operation of the invention the signal light 10 is often emersed in the water as boats are launched from the boat trailer 11. Water flowing into the housing 12 through the opening 16 therein flows upwardly into the housing 17 through the opening 21. As the water moves upwardly in the housing 17 air trapped in the housing 17 is compressed and finally stabilizes at a point where the water has not yet reached the bulb 24 or the socket 23 thus preventing corrosion of the electrical connections between the bulb 24 and the socket 23.

Having thus described the preferred embodiment of the invention it should be understood that numerous structural modifications and adaptations may be resorted to without departing from the spirit of the invention.

What is claimed is:

1. A waterproof signal light for trailers comprising a metallic housing, a lense detachably secured in the rear wall of said housing, a transparent plastic air tight inner housing positioned in said metal housing and secured in sealed relation to the inner surface of said lense, said inner housing having an opening through the bottom wall only thereof corresponding to the opening in said metal housing, and means extending upwardly through said openings in said housing for supporting the signal bulb in said inner housing.

2. A device as claimed in claim 1 wherein the means extending upwardly through said openings for supporting the signal bulb comprises a generally U-shaped bracket, an electric socket secured to said bracket and supporting said electric bulb, and a plate secured to said bracket and detachably secured to said metal housing with said plate extending across the opening in said metal housing.

* * * * *